(12) United States Patent
Kim et al.

(10) Patent No.: US 12,307,093 B2
(45) Date of Patent: May 20, 2025

(54) PIM COMPUTING SYSTEM AND PIM COMPUTATION OFFLOADING METHOD THEREOF

(71) Applicants: SK hynix Inc., Icheon-si (KR); KOREA UNIVERSITY RESEARCH AND BUSINESS FOUNDATION, Seoul (KR)

(72) Inventors: Seon Wook Kim, Namyangju (KR); Chang Hyun Kim, Seongnam (KR); Won Joon Lee, Seongnam (KR)

(73) Assignees: SK hynix Inc., Icheon-si (KR); KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 179 days.

(21) Appl. No.: 18/069,026

(22) Filed: Dec. 20, 2022

(65) Prior Publication Data
US 2023/0400985 A1 Dec. 14, 2023

(30) Foreign Application Priority Data
Jun. 9, 2022 (KR) .......................... 10-2022-0070129

(51) Int. Cl.
*G06F 3/06* (2006.01)
*G06F 15/78* (2006.01)

(52) U.S. Cl.
CPC .......... *G06F 3/0613* (2013.01); *G06F 3/0659* (2013.01); *G06F 3/0673* (2013.01); *G06F 15/7821* (2013.01)

(58) Field of Classification Search
CPC .. G06F 15/7821; G06F 3/0613; G06F 3/0659; G06F 3/0673; G06F 13/28;
(Continued)

(56) References Cited

U.S. PATENT DOCUMENTS 7,913,022 B1 * 3/2011 Baxter ................ G06F 13/1605
711/149
2017/0116154 A1 * 4/2017 Palmer ................ G06F 9/30098
(Continued)

FOREIGN PATENT DOCUMENTS

KR   10-2020-0066953 A   6/2020
KR      10-2213258 B1    2/2021

OTHER PUBLICATIONS

Understanding a Modern Processing-in-Memory Architecture: (Year: 2021).*
(Continued)

*Primary Examiner* — Yaima Rigol (57) ABSTRACT

A Processing-In-Memory (PIM) computing system and a PIM computation offloading method thereof perform PIM computation offloading using a DMA engine. The DMA engine is configured to process a transaction by respectively performing descriptor requests and PIM requests for one or more descriptors stored in a memory, in response to a memory request of a CPU. The memory includes a PIM unit and a memory array, which memory array may be a DRAM. In response to the PIM requests, the PIM unit performs PIM operations using information included in data provided to the DMA engine in response to the descriptor requests.

7 Claims, 8 Drawing Sheets

(58) Field of Classification Search
CPC ........ G06F 3/0658; G06F 9/26; G06F 9/3004; G06F 9/466; G06F 2213/28
See application file for complete search history.

(56) References Cited

U.S. PATENT DOCUMENTS

| | | |
|---|---|---|
| 2021/0150311 A1* | 5/2021 | Zhou ..................... G11C 16/10 |
| 2021/0263865 A1* | 8/2021 | Lee ......................... G06N 3/10 |
| 2022/0083486 A1* | 3/2022 | George ................... G06F 13/28 |
| 2022/0179810 A1* | 6/2022 | Lendre ................... G06F 13/28 |
| 2023/0195375 A1* | 6/2023 | Puthoor ................ G06F 3/0659 |
| | | 711/154 |

OTHER PUBLICATIONS

Design and Evaluation of a Processing-in-Memory Architecture for the Smart Memory Cube (Year: 2016).*
Hot Chips 31 Analysis: In-Memory Processing by UPMEM (Year: 2019).*
TMS320C6000 DMA Example Applications (Year: 2002).*
Microchip Direct Memory Access (Year: 2011).*

* cited by examiner

PIM COMPUTING SYSTEM AND PIM COMPUTATION OFFLOADING METHOD THEREOF

CROSS-REFERENCE TO RELATED APPLICATION

This application claims priority under 35 U.S.C. § 119 to Korean Patent Application No. 10-2022-0070129 filed on Jun. 9, 2022, which is incorporated herein by reference in its entirety.

BACKGROUND

1. Field

Embodiments relate to a processing-in-memory (PIM) computing system, and more particularly, to a PIM computing system which performs PIM computation offloading by using a Direct Memory Access (DMA) engine, and a PIM computation offloading method thereof.

2. Discussion of the Related Art

A central processing unit (CPU) of a system which uses a semiconductor memory may read code or data stored in the semiconductor memory, may execute a designated program, and may store a result thereof in the semiconductor memory. An example of the semiconductor memory may include a Dynamic Random-Access Memory (DRAM).

Recently, a semiconductor memory has been developed having a PIM computation function. The PIM computation function is a function that performs a computation inside the semiconductor memory to prevent congestion from occurring due to data movement, such as may occur in the machine learning, high-performance computing, and big data processing fields.

A system which uses a semiconductor memory having a PIM computation function as described above may be referred to as a PIM computing system.

In general, a PIM computation may be performed using a standard memory request, and the PIM computing system may include a DMA engine for controlling the PIM computation.

In an illustrative PIM computing system, a CPU may transfer a large-capacity memory request to a DRAM for a PIM computation, and the DMA engine may control the PIM computation in response to the memory request.

In the PIM computing system, a cache hierarchy may exist between the CPU and the DRAM. Therefore, a memory request transferred from the CPU to the DRAM may cause an overhead related with data consistency because of a limitation of the cache hierarchy.

Generally, the above-described problem of cache-related overhead may be solved by changing the design of the PIM computing system. A change in the design of the PIM computing system may require a change in the design of the DMA engine.

However, the change in the design of the PIM computing system or the DMA engine may have a problem in that implementation may be complicated and versatility may be limited.

Accordingly, there is a need for a PIM computing system that is able to perform a PIM computation in response to a large-capacity memory request without changing the design of the DMA engine and without relying on a complicated or inflexible implementation.

SUMMARY

Various embodiments are directed to a PIM computing system capable of processing a large-capacity memory request for a PIM computation without an overhead issue related to a cache hierarchy by using a DMA engine and effectively performing the PIM computation, and a PIM computation offloading method thereof.

In addition, various embodiments are directed to a PIM computing system capable of offloading a PIM computation corresponding to a large-capacity memory request to a DMA engine without changing the design of the DMA engine, and a PIM computation offloading method thereof.

In an embodiment, a PIM computing system may include: a central processing unit (CPU) configured to transmit a memory request for offloading of a processing-in-memory (PIM) computation; a DRAM including a memory array which stores PIM transactions for the PIM computation as descriptors and a PIM device which performs a PIM transaction when the PIM transaction is generated, each of the descriptors including a next descriptor address, operand address information and an opcode; and a direct memory access (DMA) engine configured to store a current descriptor address and a tail descriptor address by the memory request, and sequentially provide a descriptor request and a PIM request for each of the descriptors of the DRAM sequentially selected by the first current descriptor address and the last tail descriptor address, wherein, in response to the descriptor request, the PIM device stores the operand address information and the opcode among descriptor information read to the DMA engine, in the PIM device, and wherein, in response to the PIM request, the PIM device performs the PIM transaction by using the registered operand address information and opcode.

In an embodiment, a PIM computation offloading method of a PIM computing system may include: storing a current descriptor address and a tail descriptor address in a DMA engine by transmitting a memory request for offloading of a PIM computation, by a CPU; before the PIM computation, storing all PIM transactions for the PIM computation as descriptors in a memory array of a DRAM and registering descriptor address information in a PIM device of the DRAM, by the CPU; sequentially selecting the descriptors from the current descriptor address to the last tail descriptor address for the PIM computation and reading descriptor information by providing a descriptor request for a selected descriptor, by the DMA engine; providing operand address information and an opcode in the read descriptor information, to the PIM device, by the DMA engine; identifying the descriptor request and registering the operand address information and the opcode provided from the DMA engine, by the PIM device; providing a PIM request which generates a PIM transaction, on the basis of the read descriptor information, by the DMA engine; identifying the PIM request and performing the PIM transaction by using the registered operand address information and opcode, by the PIM device; and completing the PIM computation by providing the descriptor request and the PIM request for each of the descriptors from the current descriptor address to the last tail descriptor address.

According to the embodiments of the present disclosure, advantages are provided in that it is possible to process a large-capacity memory request for a PIM computation without an overhead issue related with a cache hierarchy without changing the design of a DMA engine or complicated or inflexible changes to an existing function.

In addition, according to the embodiments of the present disclosure, advantages are provided in that, by storing information necessary for offloading, such as an opcode, by utilizing a spare bit field of a descriptor stored for a PIM computation, and by using the information in a configuration for a PIM transaction, it is possible to effectively perform the PIM computation without altering a general DMA operation.

DETAILED DESCRIPTION

Hereinafter, embodiments of the disclosure will be described in detail with reference to the accompanying drawings. The terms used herein and in the claims shall not be construed as being limited to general or dictionary meanings and shall be interpreted as the meanings and concepts corresponding to technical aspects of the disclosure.

Embodiments described herein and configurations illustrated in the drawings are preferred embodiments of the disclosure, but may not represent all of the technical features of the disclosure. Thus, there may be various equivalents and modifications that can be made thereto at the time of filing the present application.

The present disclosure discloses a system and method capable of effectively performing a PIM computation by using a DMA engine as an engine for offloading the PIM computation.

In an embodiment of the present disclosure, a large-scale PIM computation for a plurality of transactions may be offloaded from a CPU to a DMA engine, and the DMA engine may be configured to perform the large-scale PIM computation in response to a memory request without subsequent communication with the CPU.

Figure 1:
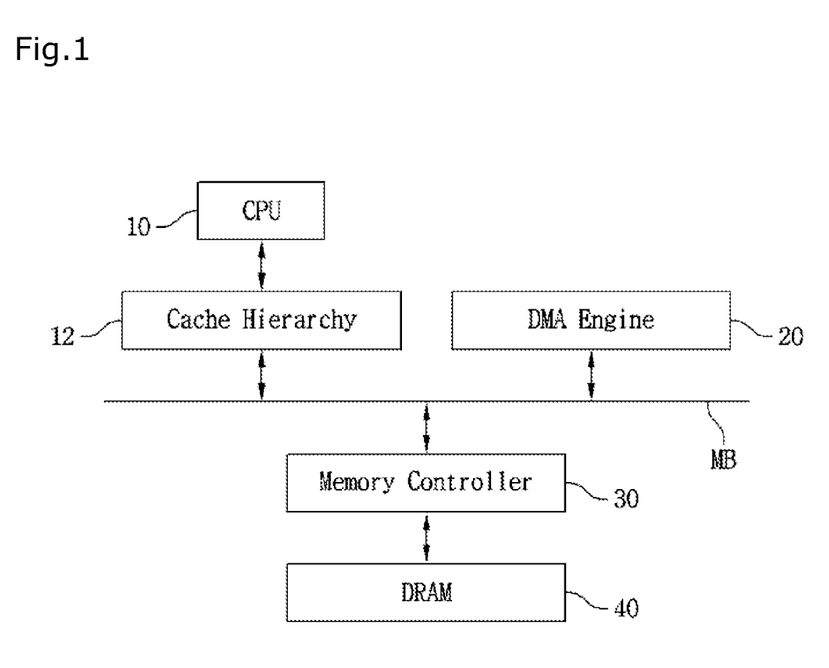
FIG. 1 is a block diagram illustrating a PIM computing system in accordance with an embodiment of the present disclosure.

Referring to FIG. 1, a PIM computing system in accordance with an embodiment of the present disclosure may include a CPU 10, a cache hierarchy 12, a DMA engine 20, a memory controller 30 and a DRAM 40.

In the embodiment of the present disclosure, input/output of data through the cache hierarchy 12 by the CPU 10, input/output of data through the memory controller 30 by the DRAM 40, and offloading of a memory request to the DMA engine 20 may be performed using a memory bus MB.

The cache hierarchy 12 may be configured to temporarily store data of the CPU 10 inputted and/or outputted through the memory bus MB, and an amount of data to be inputted and/or outputted by the CPU 10 may be limited by the cache capacity of a cache hierarchy 12.

An embodiment of the present disclosure is configured to offload a PIM computation to the DMA engine 20 in order to prevent memory requests for a large-scale PIM computation being limited by the cache capacity of the cache hierarchy 12.

To this end, the CPU 10 may provide a memory request for offloading the PIM computation to the DMA engine 20. A memory request for offloading a large-scale PIM computation will be described later with reference to FIGS. 2 and 3.

Before the PIM computation, the CPU 10 may provide the DRAM 40 with information necessary for the PIM computation. The information provided from the CPU 10 to the DRAM 40 before the PIM computation may include descriptors to be stored in a memory array of the DRAM 40, which will be described later, and descriptor address information to be stored in a PIM control register set of a PIM interface unit of the DRAM 40, which will be described later.

A control register having a preset data structure may be included in the DMA engine 20, and data corresponding to a memory request of the CPU 10 may be stored in the control register. An example of a data structure of the control register is shown in FIG. 2.

Figure 2:
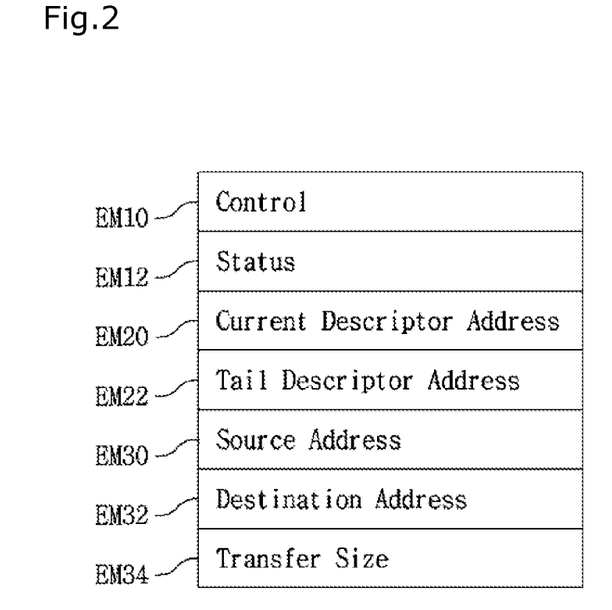
FIG. 2 illustrates a data structure of a register for a CPU to control a DMA engine.

Referring to FIG. 2, the control register of the DMA engine 20 may be configured to store control information EM10, a status EM12, a current descriptor address EM20, a tail descriptor address EM22, a source address EM30, a destination address EM32, and a transfer size EM34 in preset respective address spaces.

The control register of the DMA engine 20 may be set by information transferred through the memory request of the CPU 10.

The CPU 10 may request, through a memory request, the DMA engine 20 to perform one transaction or two or more transactions. For example, a memory request for two or more transactions may be a memory request for a large-scale PIM computation.

Figure 3:
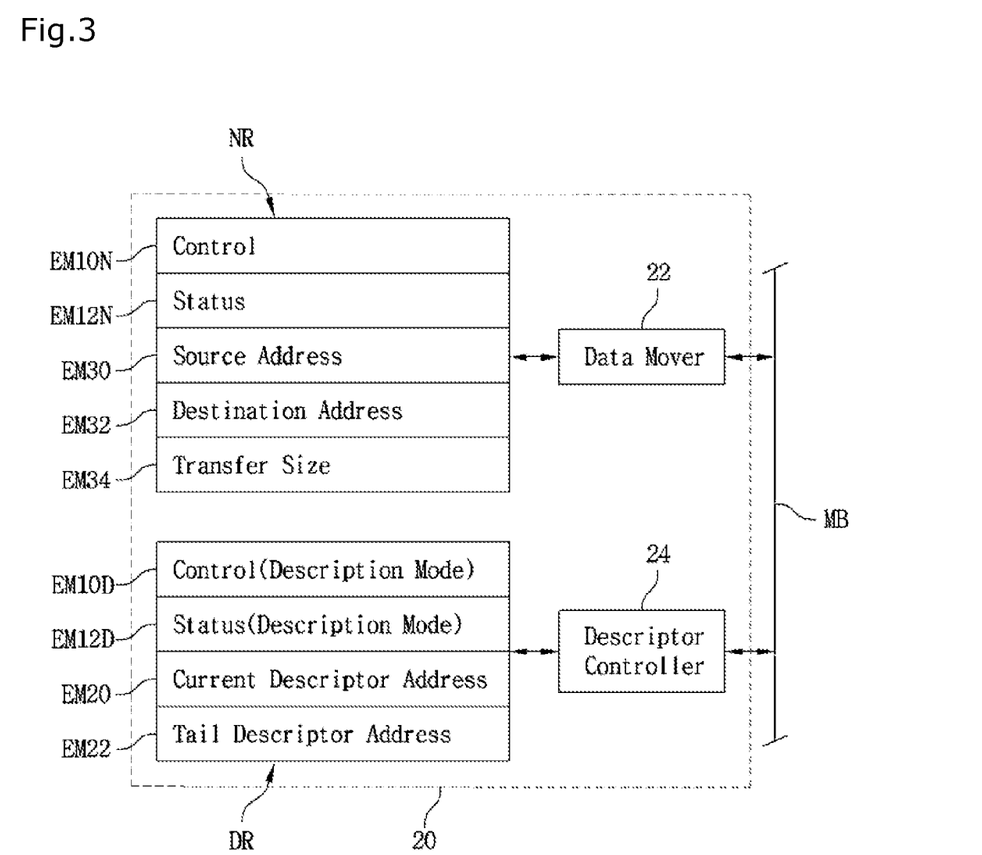
FIG. 3 illustrates details of the DMA engine.

In another example, the DMA engine 20 may be configured as shown in FIG. 3 to process a transaction of the CPU 10. In FIG. 3, the control register is divided into a normal register NR and a description register DR, which is different than the example shown in FIG. 2. However, it may be understood that the normal register NR and the description register DR may be included in one control register. For example, control information EM10N in normal register NR and control information EM10D in descriptor register DR of FIG. 3 may be stored in control information EM10 of FIG. 2, and the status EM12N in normal register NR and the status EM12D in descriptor register DR of FIG. 3 may be stored in the status EM12 of FIG. 2.

Referring to FIG. 3, the DMA engine 20 may include a data mover 22 for processing one transaction and a descriptor controller 24 for processing two or more transactions.

When the CPU 10 provides a memory request for one DMA transaction, the DMA engine 20 may register information for the transaction, transferred through the memory request, in the normal register NR, and the data mover 22 may control the one transaction by using the information stored in the normal register NR.

When a memory request for one DMA transaction is provided, the DMA engine 20 may store control information EM10N, a status EM12N, a source address EM30, a destination address EM32 and a transfer size EM34, included in the memory request, in preset address spaces of the normal register NR.

When the CPU 10 provides a memory request for two or more transactions in an order for performing a large-scale PIM computation, the DMA engine 20 may store information for the transactions, transferred through the memory request, in the description register DR, and the descriptor controller 24 may sequentially control the two or more transactions using the information stored in the description register DR.

When a memory request for two or more transactions is provided, the DMA engine 20 may store control information EM10D of a description mode, a status EM12D of the description mode, a current descriptor address EM20 and a tail descriptor address EM22, each included in the memory request, in preset address spaces of the description register DR.

In response to the memory request for a large-scale PIM computation, the descriptor controller 24 may sequentially control the two or more transactions corresponding to the memory request by traversing an ordered list of descriptors (in this example, a linked-list) using a first current descriptor address and a last tail descriptor address.

That is to say, in response to the memory request for a large-scale PIM computation, the DMA engine 20 may perform a first PIM computation by using descriptor information corresponding to a first current descriptor address, may perform a successive PIM computation by using descriptor information corresponding to a next descriptor address included in the descriptor information corresponding to the first current descriptor address, and after performing one or more successive PIM computations in this way, may perform a last PIM computation by using descriptor information corresponding to a last tail descriptor address.

The first current descriptor address, the next descriptor address, and the last tail descriptor address will be described below with reference to FIGS. 4 and 5.

Figure 4:
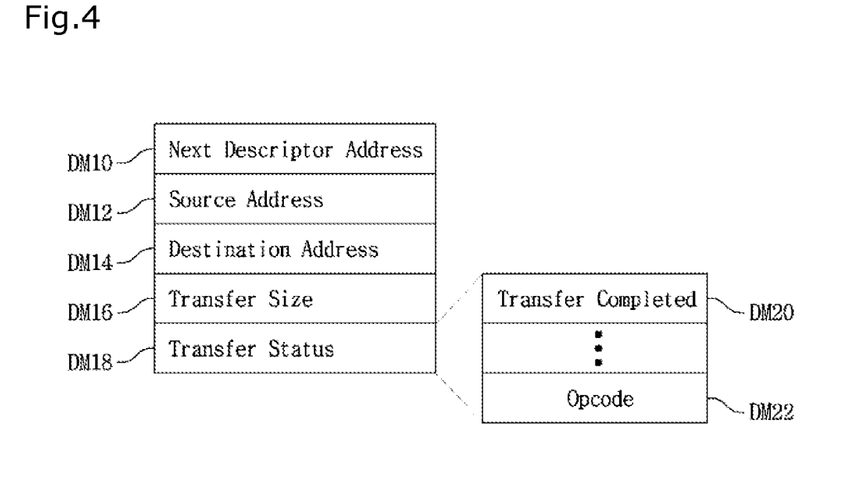
FIG. 4 illustrates a data structure of a descriptor in accordance with the embodiment of the present disclosure.
Figure 5:
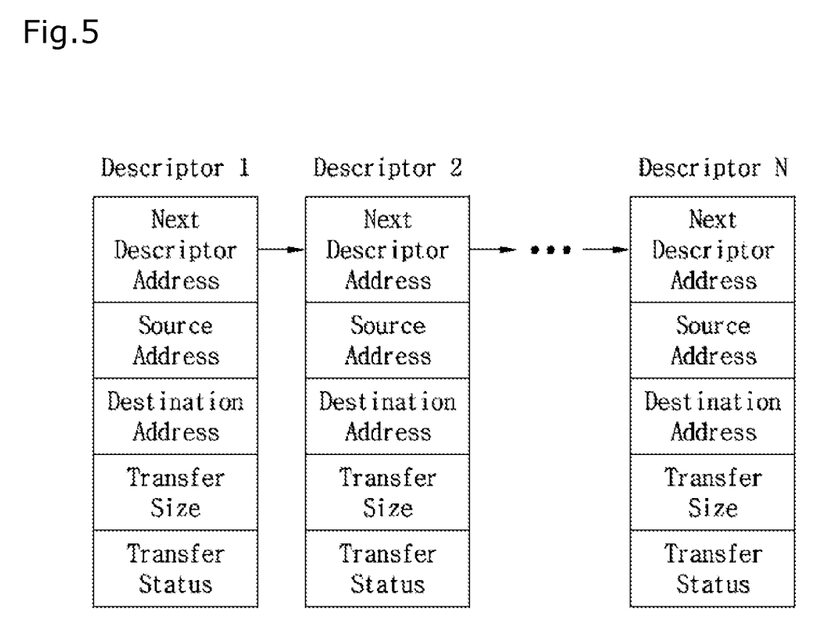
FIG. 5 illustrates structures of descriptors.

In order to control a plurality of PIM transactions corresponding to a large-scale memory request, the embodiment of the present disclosure may store PIM transactions for a PIM computation, as descriptors, in the DRAM 40 as shown in FIGS. 4 and 5. The descriptors may be stored by being distributed in one or more memory banks of the memory array 60 of the DRAM 40, which will be described later with reference to FIG. 6.

Each descriptor stored in the memory array 60 of the DRAM 40 may be configured to have a data structure as shown in FIG. 4, and the descriptors may have a connection structure as shown in FIG. 5.

It may be understood that the descriptors stored in the memory array 60 of the DRAM 40 as described above are stored by the CPU 10 before the PIM computation described above.

As shown in FIG. 4, each descriptor may have a data structure including a next descriptor address DM10, operand address information, a transfer size DM16, and a transfer status DM18. The operand address information may include a source address DM12 and a destination address DM14.

Among them, the transfer status DM18 may have a spare space for registering codes or data for other utilization.

Each descriptor may include information for a corresponding transaction connected to the next descriptor address DM10 for a next transaction in an order of the plurality of transactions. The information for the corresponding transaction may correspond to the operand address information, the transfer size DM16 and the transfer status DM18.

The embodiment of the present disclosure may be configured to include an opcode DM22 in the spare space of the transfer status DM18, and may include a transfer completed field DM20, and so on.

Each of the descriptors has the next descriptor address DM10 for a subsequent descriptor (except, in some embodiments, the last descriptor in the sequence of descriptors). Therefore, a descriptor which is subsequent to a current descriptor may be designated by a next descriptor address included in the current descriptor.

In FIG. 5, it may be understood that a descriptor 1 corresponds to a first current descriptor address, a descriptor 2 corresponds to the next descriptor address of the descriptor 1 and a descriptor N corresponds to a last tail descriptor address.

The descriptors may be sequentially connected by next descriptor addresses (that is, in a linked list) for the PIM computation.

Accordingly, when a large-scale memory request is offloaded to the DMA engine 20, the DMA engine 20 may register a first current descriptor address (indicating a head of the link list) and a last tail descriptor address (indicating a tail of the linked list), provided through the memory request, in the description register DR, and may sequentially control transactions of descriptors by using the next descriptor address of each descriptor. In other words, as shown in FIG. 5, the DMA engine 20 may sequentially control transactions for corresponding descriptors from the first current descriptor address to the last tail descriptor address.

The DMA engine 20 may sequentially provide a descriptor request and a PIM request for each transaction.

Figure 6:
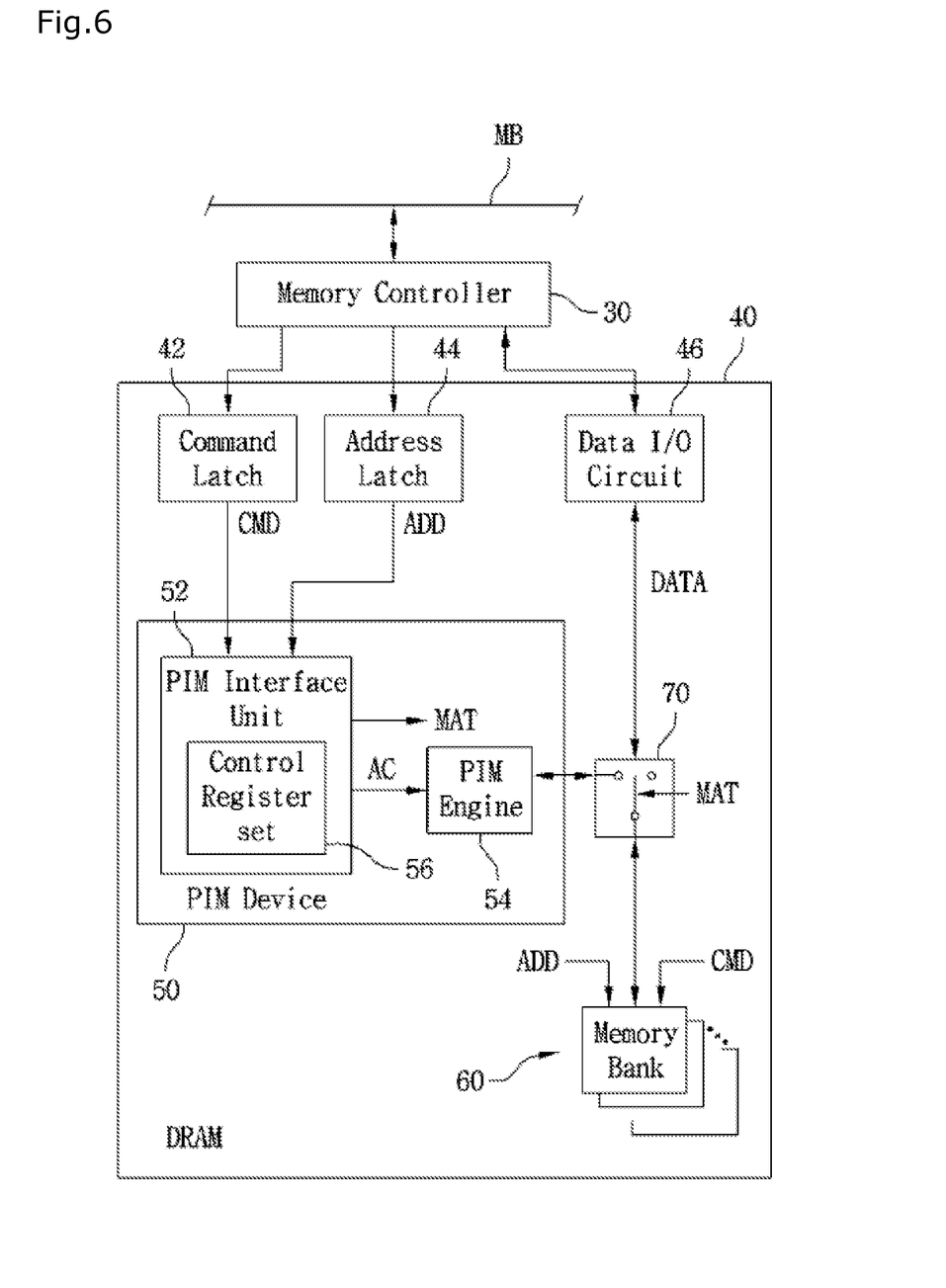
FIG. 6 illustrates details of a DRAM including a PIM engine.

Of them, the descriptor request may include the DMA engine 20 reading information for a transaction from the DRAM 40. Namely, the DMA engine 20 may read descriptor information stored in the memory array 60 of the DRAM 40, using descriptor address information corresponding to a predetermined order, in response to a memory request.

The PIM request may include the DMA engine 20 controlling a transaction. That is to say, the DMA engine 20 may control a transaction for a PIM computation of the DRAM 40, using the descriptor information read by the descriptor request.

A detailed configuration of the DRAM 40 which performs a transaction under the control of the DMA engine 20 will be described below with reference to FIG. 6. Note that while the illustrative embodiment presented herein shows the DRAM 40 having a memory array 60 comprised of dynamic memory cells, embodiments are not limited thereto, and in other embodiments, the DRAM 40 may instead be a semiconductor memory similar to the DRAM 40 of FIG. 6 but having a memory array comprised of, for example, static memory cells or non-volatile memory cells.

The DRAM 40 is configured to communicate with the CPU 10 and the DMA engine 20 through the memory controller 30 which is connected to the memory bus MB, and may receive command information and address information and transmit and receive data.

It may be understood that the memory controller 30 schedules a memory request and data input/output for the DRAM 40.

The DRAM 40 may include a command latch 42, an address latch 44 and a data input/output circuit 46.

The command latch 42 may be configured to receive, temporarily store, and output command information CMD provided through the memory controller 30 and to provide command information CMD for a PIM computation to a PIM device 50 which will be described below. The command information CMD for a PIM computation may have been provided from the DMA engine 20, and may include bank activation, read, write, and refresh information for controlling the memory array 60.

The address latch 44 may be configured to receive, temporarily store, and output address information ADD provided through the memory controller 30, and the address information ADD may indicate a bank address, a row address, and a column address. Address information ADD for a PIM computation may have been provided from the DMA engine 20, and may represent, for example, address information of a descriptor or address information of an operand.

The data input/output circuit 46 may be configured to input and output data DATA, such as inputting data for storing descriptors and outputting data corresponding to a descriptor request.

The DRAM 40 may further include the PIM device 50 and the memory array 60.

The memory array 60 is configured to have a plurality of memory banks, and it may be understood that the memory banks include memory cell arrays, respectively, of a predetermined storage capacity. The memory array 60 may be configured to receive the command information CMD provided from the command latch 42 and the address information ADD provided from the address latch 44 and to read or write data through an input/output path.

For example, the memory array 60 may store descriptors corresponding to transactions for a PIM computation in the plurality of memory banks.

The memory array 60 may process data corresponding to the address information ADD by the command information CMD such as bank activation, read, write, and refresh.

In particular, when the DMA engine 20 requests the read of descriptor information, the memory array 60 may read and output descriptor information of a corresponding address.

In the case of a transaction for a PIM computation, the memory array 60 may read an operand of designated address information and provide the operand to the PIM device 50 or may write a PIM computation result provided from the PIM device 50 using designated address information.

The PIM device 50 is configured to perform a transaction under the control of the DMA engine 20.

In more detail, the PIM device 50 may register operand address information and an opcode provided from the DMA engine 20 in the PIM control register set 56 which will be described below, in response to a descriptor request from the DMA engine 20. That is, the DMA engine 20 may read descriptor information from the memory array 60 in response to a memory request, and may provide operand address information and an opcode included in the read descriptor information to the PIM device 50, and the PIM device 50 may then store the operand address information and the opcode in the PIM control register set 56.

The PIM device 50 may be configured to perform a transaction using stored operand address information and opcode in response to a PIM request of the DMA engine 20.

To this end, the PIM device 50 may include the PIM interface unit 52 and a PIM engine 54.

The PIM interface unit 52 includes the PIM control register set 56, and may be configured to receive the command information CMD and the address information ADD, to receive descriptor information read in response to a descriptor request, and to provide a computation control signal AC.

Figure 7:
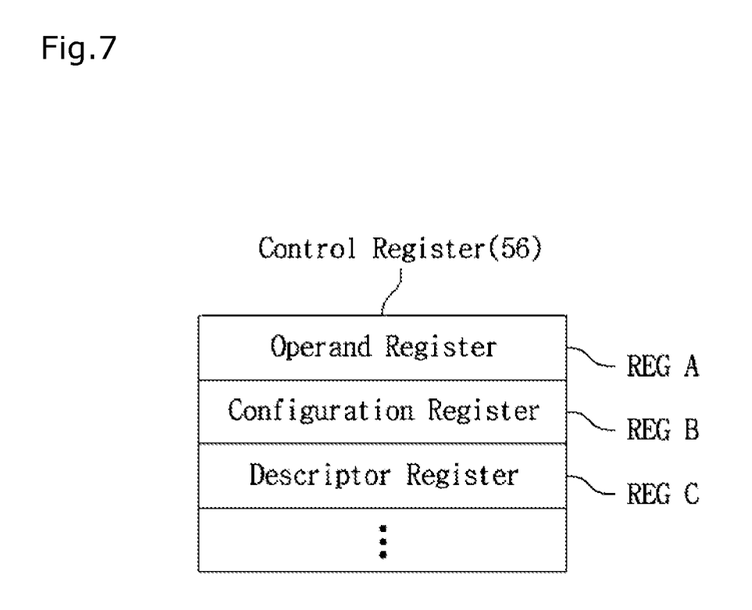
FIG. 7 is a diagram illustrating a data structure of a PIM control register set of the DRAM of FIG. 6.

As shown in FIG. 7, the PIM control register set 56 may include an operand register REG A, a configuration register REG B, and a descriptor register REG C.

The operand register REG A is to store operand address information. In an embodiment of the present disclosure, the operand register REG A is configured by the DMA engine 20. Therefore, one operand address for a corresponding transaction may be stored in the operand register REG A.

The configuration register REG B is to store an opcode. In an embodiment of the present disclosure, one opcode which defines an operation for an operand corresponding to one operand address stored in the operand register REG A may be stored in the configuration register REG B.

The descriptor register REG C is to store one or more descriptor address information. The descriptor register REG C is used to identify a descriptor request, and stores descriptor address information provided from the CPU 10 before a corresponding PIM computation. The descriptor address information may include a start address and a size of a descriptor. The descriptor address information stored in the descriptor register REG C may be for descriptors which are stored in successive regions; that is, descriptors stored one after the other in a contiguous region of memory. In the case of a non-successive descriptor, it may be necessary for the CPU 10 to register the non-successive descriptor in the descriptor register REG C before the CPU 10 causes the DMA engine 20 to perform an operation using the non-successive descriptor.

When the DMA engine 20 provides the address information ADD for a descriptor request, the PIM interface unit 52 identifies the descriptor request by comparing the address information ADD provided by the DMA engine 20 with the descriptor address information of the descriptor register REG C. When the address information ADD of the DMA engine 20 corresponds to one of the descriptor address information of the descriptor register REG C, the PIM interface unit 52 may identify that the DMA engine 20 has provided the descriptor request. For example, the address information ADD may correspond to a descriptor address information when the address information ADD indicates an address equal to or greater than the start address of that descriptor address information but less than a sum of the start address and the size indicated in that descriptor address information.

When the descriptor request is identified, the PIM interface unit 52 may be configured to store operand address information included in descriptor information read from the memory array 60 and delivered to the DMA engine 20 in response to the descriptor request in the operand register REG A and to store an opcode included in that descriptor information in the configuration register REG B.

When the DMA engine 20 provides the address information ADD for a PIM request, the PIM interface unit 52 identifies the PIM request by comparing the address information ADD of the DMA engine 20 with the operand address information of the operand register REG A. When the address information ADD of the DMA engine 20 and the operand address information of the operand register REG A match each other, the PIM interface unit 52 may determine that the DMA engine 20 has provided the PIM request.

In the case of the PIM request, the PIM interface unit 52 may be configured to provide the computation control signal AC for execution of a transaction, by using the operand address information stored in the operand register REG A and the opcode stored in the configuration register REG B. The command information CMD such as bank activation, read, write, and refresh may be used in providing the computation control signal AC.

The PIM engine 54 may be configured to perform a computation for a transaction in response to the computation control signal AC and provide a computation result in response to the PIM request. The computations that may be performed by a PIM engine such as the PIM engine 54, which may include arithmetic operations, logical operations, and combinations thereof, are widely known in the related arts, and accordingly a detailed description thereof is omitted.

The computation control signal AC may include operand address information and an opcode. The PIM engine 54 may read an operand corresponding to the operand address information or write a PIM computation result to the operand address information, and a computation attribute which determines read or write may be determined by the opcode.

When the transaction is completed, the PIM device 50 may report the completion of the PIM request to the DMA engine 20. To this end, for example, the PIM engine 54 may notify the PIM interface unit 52 of the end of the transaction when the transaction is ended, and the PIM interface unit 52 may notify the DMA engine 20 of the end of the transaction through a data path. The above-described method of notifying the end of the transaction is nothing but a mere example, and the end of the transaction may be transferred to the DMA engine 20 in various ways by an implementor of an embodiment.

When the transaction for the PIM computation is being processed, the memory array 60 needs to be connected to the PIM engine 54 for data input/output.

To this end, a switch 70 may be configured. The switch 70 may provide a data path between the memory array 60 and the data input/output circuit 46, or a data path between the memory array 60 and the PIM engine 54, depending on a state of a matching signal MAT.

The matching signal MAT may be provided by the PIM interface unit 52. The PIM interface unit 52 may provide the matching signal MAT for forming the data path between the memory array 60 and the PIM engine 54, when the PIM request is identified.

Figure 8:
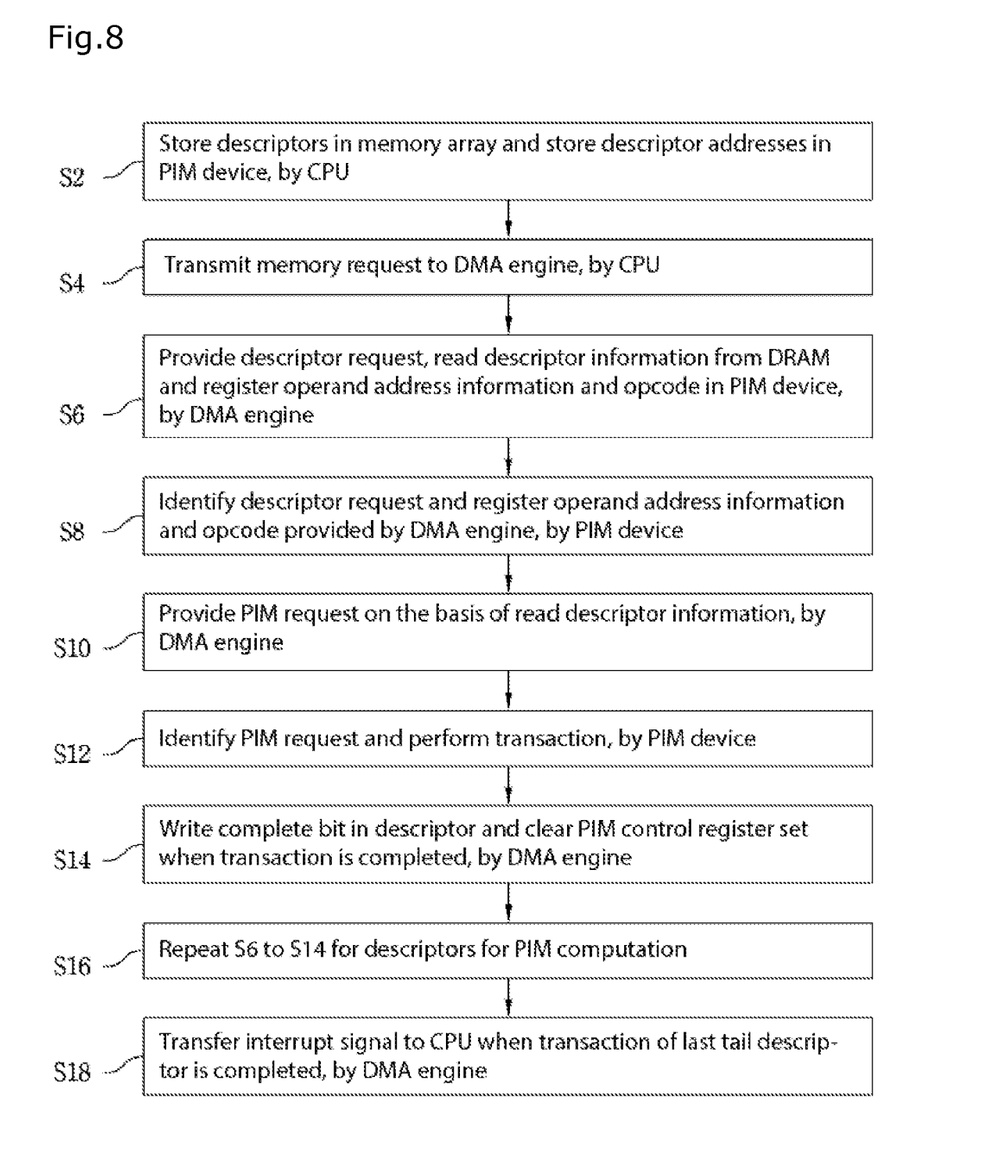
FIG. 8 is a flowchart illustrating a PIM computation offloading method using the system of FIG. 1.

A PIM computation method in accordance with the embodiment of the present disclosure configured as mentioned above will be described below with reference to FIG. 8.

First, for a PIM computation, the CPU 10 stores transactions necessary for the PIM computation as descriptors in the memory array 60 of the DRAM 40 (S2). Before the PIM computation, the descriptors may be provided by the CPU 10 and may be stored in the memory array 60 of the DRAM 40.

Also, before the PIM computation, the CPU 10 may store descriptor address information of the descriptors to be stored in the memory array 60 of the DRAM 40, in the PIM interface unit 52 (S2). In more detail, the descriptor address information may be stored in the descriptor register REG C of the PIM control register set 56 of the PIM interface unit 52.

The CPU 10 may transmit a memory request to the DMA engine 20 (S4).

In other words, the CPU 10 may provide a memory request for offloading two or more transactions for a large-scale PIM computation to the DMA engine 20, and may notify the DMA engine 20 of addresses of first and last descriptors for the PIM computation through the memory request.

By the memory request, control information EM10 of a description mode, a status EM12 of the description mode, a current descriptor address EM20, and a tail descriptor address EM22 may be stored in the descriptor register DR of the DMA engine 20. The current descriptor address EM20 corresponds to a first descriptor address, and the tail descriptor address EM22 corresponds to a last descriptor address. In an embodiment, the first descriptor address and the last descriptor address may be addresses of a head and a tail of a link list of descriptors, respectively.

The DMA engine 20 may sequentially control the transactions for the large-scale PIM computation corresponding to the memory request.

A first transaction may be performed on a descriptor corresponding to the current descriptor address EM20.

Therefore, the DMA engine 20 may provide a descriptor request for the descriptor corresponding to the current descriptor address EM20, may read descriptor information corresponding to the current descriptor address EM20 stored in the memory array 60 of the DRAM 40, and in correspondence to the descriptor request may provide an operand address and an opcode included in the descriptor information, to the PIM interface unit 52 of the PIM device 50 (S6).

It may be understood that the descriptor request includes the command information CMD for a read and the address information ADD corresponding to the descriptor, and the memory array 60 of the DRAM 40 may read the descriptor corresponding to the address information ADD in response to the command information CMD and may provide the descriptor to the DMA engine 20.

It may be understood that the switch 70 provides a data path between the memory array 60 and the data input/output circuit 46, depending on a state of the matching signal MAT.

When the DMA engine 20 provides the address information ADD for the descriptor request, the PIM interface unit 52 of the PIM device 50 may identify the descriptor request, and may store operand address information and the opcode provided in response to the descriptor request to the DMA engine 20 in the operand register REG A and the configuration register REG B (S8).

In more detail, the PIM interface unit 52 may identify the descriptor request by comparing the address information ADD provided from the DMA engine 20 with one or more address information stored in the descriptor register REG C. When the address information ADD of the DMA engine 20 corresponds to one of the address information of the descriptor register REG C, the PIM interface unit 52 may determine that the DMA engine 20 has provided the descriptor request.

In the case of the descriptor request, the DMA engine 20 may be provided the operand address information and the opcode among the descriptor information read from the memory array 60, and during that process the PIM interface unit 52 may store that operand address information in the operand register REG A and store that opcode in the configuration register REG B.

The DMA engine 20 may provide a PIM request on the basis of the read descriptor information (S10). It may be understood that the PIM request includes the operand address information from the descriptor information read by the descriptor request.

The PIM device 50 may identify the PIM request and perform a transaction (S12).

The identification of a PIM request may be performed by the PIM interface unit 52. When the address information ADD provided from the DMA engine 20 matches the operand address information stored in the operand register REG A, the PIM interface unit 52 may determine that the DMA engine 20 has provided the PIM request.

It may be understood that, when the PIM request is identified, the PIM interface unit 52 provides the matching signal MAT and the switch 70 provides a data path between the memory array 60 and the PIM engine 54 depending on a state of the matching signal MAT.

The transaction may be performed by the PIM device 50 according to the computation control signal AC provided by the PIM interface unit 52. As described above, the PIM interface unit 52 may provide the computation control signal AC for execution of the transaction, by using the operand address information stored in the operand register REG A and the opcode stored in the configuration register REG B.

The PIM engine 54 may perform a computation for the transaction in response to the computation control signal AC and provide a computation result. The PIM engine 54 may perform various computations such as reading an operand corresponding to the operand address information or writing a PIM computation result to the operand address information. Therefore, a concrete example of a computation performed in the PIM engine 54 is omitted.

When the transaction of the PIM device 50 is completed, the DMA engine 20 may produce a write request to write a complete bit (for example, a bit in the transfer completed field DM20 of transfer status DM18 as shown in FIG. 4) to the descriptor for the completed transaction that is stored in the memory array 60, and may clear the PIM control register set 56 of the PIM interface unit 52 (S14).

When the transaction of a first descriptor corresponding to the current descriptor address EM20 is completed as described above, the DMA engine 20 may control a next transaction by using a next descriptor address included in the descriptor information read through the descriptor request for the current descriptor address EM20.

For example, when a transaction for the descriptor 1 of FIG. 5 is completed by the above process and the next descriptor address of the descriptor 1 designates the descriptor 2, the DMA engine 20 may control a transaction for the descriptor 2.

The DMA engine 20 may repeat the steps S6 to S14 from the descriptor 2 to the descriptor N corresponding to a last tail descriptor in FIG. 5 (S16). Since descriptor requests and PIM requests from the descriptor 2 to the descriptor N are performed by repeating the steps S6 to S14, repeated description thereof will be omitted.

When a transaction for the last tail descriptor is completed, the DMA engine 20 may provide an interrupt signal indicating the completion of the PIM computation to the CPU 10 (S18).

As is apparent from the above description, embodiments of the present disclosure provide opcodes to a PIM device 50 of a DRAM 40 without changing the design of a DMA engine or an existing function, by storing descriptors including opcodes in the memory array 60 of the DRAM 40 and storing address information of the descriptors in the PIM control register set 56 of the DRAM 40 in order to process a large-capacity memory request for a PIM computation under the control of the DMA engine.

Therefore, according to the embodiments of the present disclosure, advantages are provided in that a large-capacity memory request can be processed without an overhead issue related with a cache hierarchy of the CPU.

In addition, according to the embodiments of the present disclosure, advantages are provided in that, by storing information necessary for offloading a PIM computation, such as an opcode, by utilizing a spare bit field of a descriptor for that PIM computation, it is possible to effectively perform the PIM computation without affecting a general DMA operation.

Although various embodiments have been described for illustrative purposes, it will be apparent to those skilled in the art that various changes and modifications may be made without departing from the spirit and scope of the disclosure as defined in the following claims.

What is claimed is:

1. A Processing-In-Memory (PIM) computing system comprising:
    a central processing unit (CPU) configured to transmit a memory request for offloading of a PIM computation;
    a DRAM including a memory array which stores descriptors corresponding to PIM transactions for the PIM computation as descriptors and a PIM device which performs a PIM transaction when the PIM transaction is generated, each of the descriptors including a next descriptor address, operand address information, and an opcode; and
    a direct memory access (DMA) engine configured to store a current descriptor address and a tail descriptor address included in the memory request, and sequentially provide a descriptor request and a PIM request for each of the descriptors stored in the DRAM sequentially selected using the first current descriptor address and the last tail descriptor address,
    wherein, in response to the descriptor request, the PIM device stores the operand address information and the opcode among descriptor information read from the DRAM by the DMA engine,
    wherein, in response to the PIM request, the PIM device performs the PIM transaction by using the stored operand address information and opcode, and
    wherein:
        the PIM device includes a PIM control register set which includes an operand register, a configuration register and a descriptor register,
        descriptor address information provided from the CPU before the PIM computation is started is stored in the descriptor register,
        the PIM device identifies the descriptor request by comparing a descriptor address selected by the DMA engine for the descriptor request with the descriptor address information stored in the descriptor register, and
        the PIM device receives the operand address information and the opcode corresponding to the descriptor address read provided by the DMA engine, and in response to the identified descriptor request, stores the operand address information in the operand register, and stores the opcode in the configuration register.

2. The PIM computing system according to claim 1, wherein
    when the DMA engine provides the PIM request which generates the PIM transaction, the PIM device identifies the PIM request by comparing operand address information provided from the DMA engine for the PIM request with the operand address information stored in the operand register, and
    the PIM device executes the PIM transaction according to the opcode stored in the configuration register, in response to the identified PIM request.

3. The PIM computing system according to claim 1, wherein the PIM device comprises:
    a PIM interface unit including a PIM control register set which includes an operand register for registering the operand address information, a configuration register for registering the opcode and a descriptor register for registering descriptor address information, and configured to receive address information and command information and provide a computation control signal; and a PIM engine configured to perform a computation responding to the descriptor request and the PIM request for the PIM transaction, in response to the computation control signal, and provide a computation result by the PIM request, wherein the PIM interface unit identifies the command information of the descriptor request and the PIM request by comparing the received address information with the operand address information and the descriptor address information, wherein, when the descriptor request is identified, the PIM interface unit stores the operand address information among the descriptor information read by the DMA engine, in the operand register, and stores the opcode in the configuration register, and wherein, when the PIM request is identified, the PIM interface unit provides the computation control signal for execution of the PIM transaction, by using the operand address information stored in the operand register and the opcode stored in the configuration register.

4. The PIM computing system according to claim 3, wherein the PIM interface unit further includes a switching circuit which forms a data path between the DMA engine and the memory array when the PIM request is identified.

5. A Processing-In-Memory (PIM) computation offloading method of a PIM computing system, the method comprising:

storing a current descriptor address and a tail descriptor address in a DMA engine by transmitting a memory request for offloading of a PIM computation, by a CPU;

before the PIM computation, storing all PIM transactions for the PIM computation as descriptors in a memory array of a DRAM and registering descriptor address information in a PIM device of the DRAM, by the CPU;

sequentially selecting the descriptors from the current descriptor address to the last tail descriptor address for the PIM computation and reading descriptor information by providing a descriptor request for a selected descriptor, by the DMA engine;

providing operand address information and an opcode in the read descriptor information, to the PIM device, by the DMA engine;

identifying the descriptor request and registering the operand address information and the opcode provided from the DMA engine, by the PIM device;

providing a PIM request which generates a PIM transaction, on the basis of the read descriptor information, by the DMA engine;

identifying the PIM request and performing the PIM transaction by using the stored operand address information and opcode, by the PIM device; and completing the PIM computation by providing the descriptor request and the PIM request for each of the descriptors from the current descriptor address to the last tail descriptor address, wherein the PIM device identifies the descriptor request by comparing a descriptor address selected by the DMA engine for the descriptor request with the stored descriptor address information.

6. The PIM computation offloading method according to claim 5, wherein the PIM device identifies the PIM request by comparing operand address information provided from the DMA engine for the PIM request with the stored operand address information.

7. The PIM computation offloading method according to claim 6, wherein the PIM device executes the PIM transaction according to the stored opcode in response to the identified PIM request.

* * * * *